US007071818B2

(12) United States Patent
Lin

(10) Patent No.: US 7,071,818 B2
(45) Date of Patent: Jul. 4, 2006

(54) DEVICE USED FOR PROTECTING A CAR AGAINST THIEVERY

(76) Inventor: Jui-Yang Lin, 12F-2, No. 34, Ching Ning Street, Ping-Dung City (TW)

( * ) Notice: Subject to any disclaimer, the term of this patent is extended or adjusted under 35 U.S.C. 154(b) by 141 days.

(21) Appl. No.: 10/914,172

(22) Filed: Aug. 10, 2004

(65) Prior Publication Data

US 2006/0032278 A1 Feb. 16, 2006

(51) Int. Cl.
*B60R 25/10* (2006.01)

(52) U.S. Cl. ........................... 340/426.29; 340/426.28; 340/5.72; 340/542; 340/541; 70/241; 70/256; 70/257; 70/240

(58) Field of Classification Search ........... 340/426.29, 340/426.28, 5.72, 542, 541; 70/241, 256, 70/257, 240

See application file for complete search history.

(56) References Cited

U.S. PATENT DOCUMENTS

| | | | | |
|---|---|---|---|---|
| 5,598,140 A * | 1/1997 | Eizen | .................... | 340/426.25 |
| 6,101,854 A * | 8/2000 | Chang | .......................... | 70/202 |
| 6,230,527 B1 * | 5/2001 | Wu | ............................. | 70/209 |

* cited by examiner

*Primary Examiner*—Tai T. Nguyen
(74) *Attorney, Agent, or Firm*—Rosenberg, Klein & Lee

(57) ABSTRACT

A device includes a base secured in a car, a stopping block displaceable on the base, an actuating member for displacing the stopping block with, and a lock block secured around a steel rope of a control of a hood of the car, which control can be used to pull the steel rope for making the hood become openable; the stopping block has a big hole, and an horizontal slot communicating with the big hole and as high as center of the hole; the rope is passed through the stopping block with the lock block arranged behind the stopping block; the lock block can't pass through the slot; the stopping block is displaceable to such position as to exactly face the lock block at the slot, preventing the rope from being displaced; thus, thieves can't open the hood to cut off the power to the alarm for stopping sounding of the alarm.

9 Claims, 5 Drawing Sheets

DEVICE USED FOR PROTECTING A CAR AGAINST THIEVERY

BACKGROUND OF THE INVENTION

1. Field of the Invention

The present invention relates to a device used for protecting a car against thievery, more particularly one, which can prevent thieves from opening the hood to cut off the power to the car alarm; thus, the alarm can keep on sounding once it is activated by break-in of the thieves.

2. Brief Description of the Prior Art

Cars are usually equipped with alarms, which will sound when thieves try to break into the cars, such that the chance of them getting stolen reduces. Car alarms are usually connected with, and powered by the main battery of the cars, which are hidden under the hoods. Therefore, thieves can open the hood by means of using the hood control in front of the driver's seat after they break into a car, and then they can cut off the power to the alarm. Consequently, the alarm is inactivated, incapable of keeping on sounding to scare off the thieves and to make other people notice.

SUMMARY

It is a main object of the present invention to provide a device used for protecting a car against thievery to handle the above problem.

The device of the present invention includes a base secured in a car, a stopping block displaceable on the base, an actuating member for displacing the stopping block with, and a lock block secured around a steel rope of a control of a hood of the car, which control can be used to pull the steel rope for making the hood become openable. The stopping block has a through hole, and an horizontal slot communicating with the through hole and as high as center of the through hole. The rope is passed through the stopping block with the lock block arranged behind the stopping block. The lock block can pass through the through hole of the stopping block, but it can't pass through the slot. The stopping block is displaceable to such a position as to exactly face the lock block at the slot, thus blocking the way of the lock block; thus, thieves can't open the hood to cut off the power to the car alarm, and the alarm can keep on sounding after it is activated by break-in of the thieves.

BRIEF DESCRIPTION OF THE DRAWINGS

The present invention will be better understood by referring to the accompanying drawings, wherein.

DETAILED DESCRIPTION OF THE PREFERRED EMBODIMENTS

Figure 1:
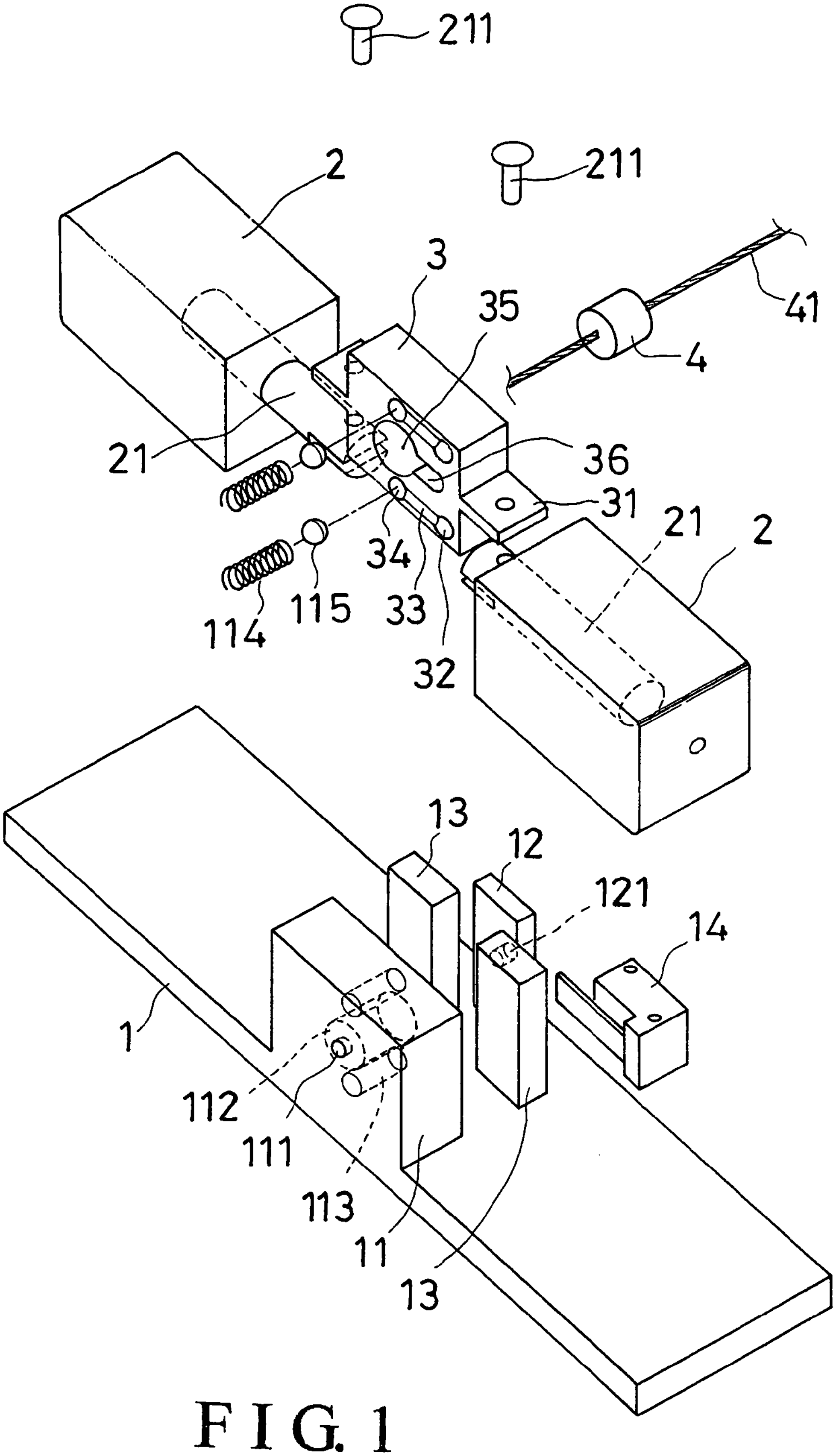
FIG. 1 is an exploded perspective view of a first embodiment of a device used for protecting a car against thievery in the present invention.

Referring to FIG. 1, a preferred embodiment of a device used for protecting a car against thievery includes a base 1, a stopping block 3, a lock block 4, and an actuating member, which consists of two electromagnets 2, and two actuating rods 21.

The base 1 is secured to a suitable portion of a car, and it is formed with a locating block 11 on a bottom portion thereof, a locating bar 12 opposing the locating block 11, two opposing post portions 13, which are between the locating block 11 and the locating bar 12, and which together define a space exactly facing the locating bar 12. The locating block 11 has a holding cavity 112 on an inward side, a through hole 111 communicating with the holding cavity 112 on an outward side, and upper and lower holding rooms 113 extending from the inward side and respectively above and under the holding cavity 112. The locating bar 12 has a through hole 121 exactly facing the through hole 112 of the locating block 11.

The electromagnets 2 of the actuating member are secured on two sides of the bottom portion of the base 1, and the actuating rods 21 are movably fitted on respective ones of the electromagnets 2 to point to a space between the locating block 11 and the two post portions 13; thus, the actuating rods 21 can be left and right displaced by means of controlling the actuating member.

The stopping block 3 has two connecting projections 31 on two lateral sides, a through hole 35 extending from a front to a rear side, a slot 36 horizontally extending from an edge of the through hole 35, two upper detaining holes 32, 34 above the through hole 35, two lower detaining holes 32, 34 under the through hole 35, and an upper guide slot 33 between and communicating with the upper detaining holes 32, 34, and a lower guide slot 33 between and communicating with the lower detaining holes 32, 34; the slot 36 is substantially as high as the center of the through hole 35. The stopping block 3 is connected with tail ends of the actuating rods 21 at the connecting projections 31 by means of securing elements 211; thus, the stopping block 3 is faced with, and relatively close to the inward side of the locating block 11 of the base 1, and it can be left and right displaced relative to the locating block 11 by means of controlling the actuating member. The upper detaining holes 32 and 34 are at the same height as the upper holding room 113 while the lower detaining holes 32 and 34 are at the same height as the lower holding room 113. And, the center of the through hole 35 is substantially aligned with the through holes 111 and 121.

Furthermore, each of the holding rooms 113 of the locating block 11 contains an elastic element 114 therein, and upper and lower beads 115 are sandwiched between the elastic elements 114 and the stopping block 3 such that they will be mounted over the corresponding detaining holes and slots 32, 34, 33.

Figure 3:
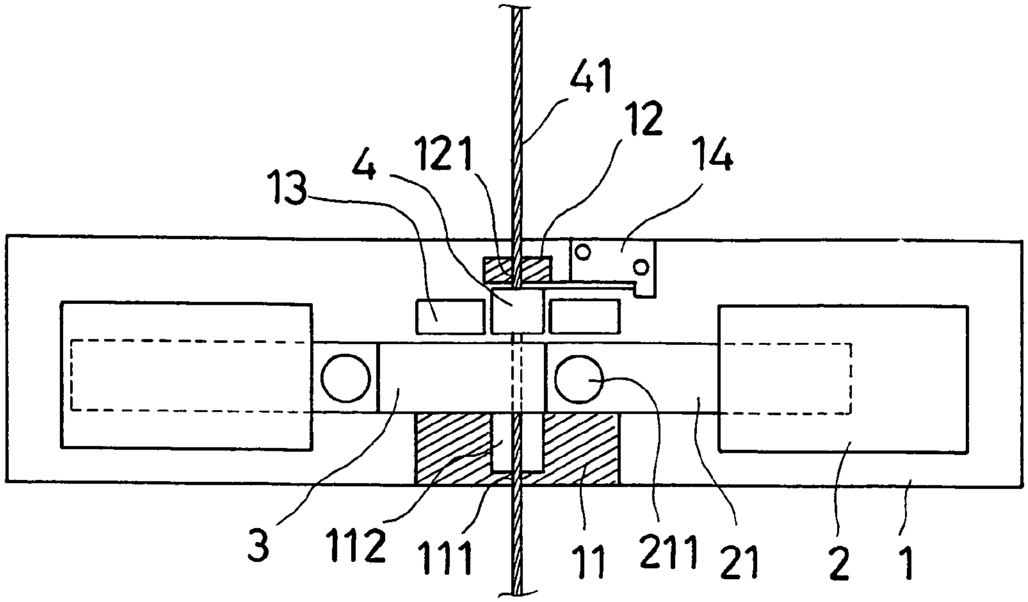
FIG. 3 is a horizontal section of the first embodiment in the locking position.
Figure 4:
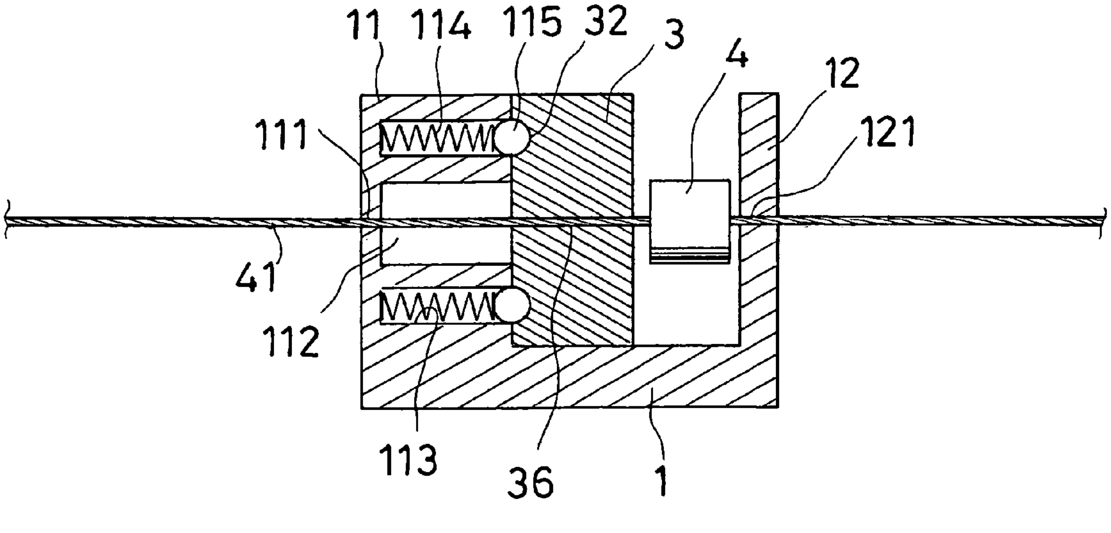
FIG. 4 is a vertical section of the first embodiment in the locking position.

The lock block 4 has a smaller diameter than the through hole 35 of the stopping block 3 and the holding cavity 112 of the base 1, but it is wider than the slot 36 of the stopping block 3, and it is secured around a steel rope 41 of a hook control of the car while the steel rope 41 is passed through the through holes 121, 35, and 111. Referring to FIGS. 3 and 4, the lock block 4 will normally be close to the locating bar 12 of the base 1 when the hood of the car is closed without external pulling force being exerted on the steel rope 41.

Furthermore, a switch is fitted next to the locating bar 12 on the base 1, which is electrically connected to an auxiliary alarm. Referring to FIG. 3, the lock block 4 will be closely pressed against the switch 14, and the alarm won't be activated when the lock block 4 is in the normal position, in which position it is closest to the locating bar 12 as mentioned above, i.e. when the hood of the car is closed without external pulling force being exerted on the steel rope 41 of the hood control. And, as soon as the hood control is used to seek to make the hood become openable, the steel rope 41 will be at least slightly linearly displaced, and the lock block 4 will move away from the normal position, no longer closely pressed against the switch 14. Thus, after the auxiliary alarm has been set to the ready mode, the alarm will be activated to make people notice if thieves seek to use the hook control to make the hood become openable.

Figure 2:
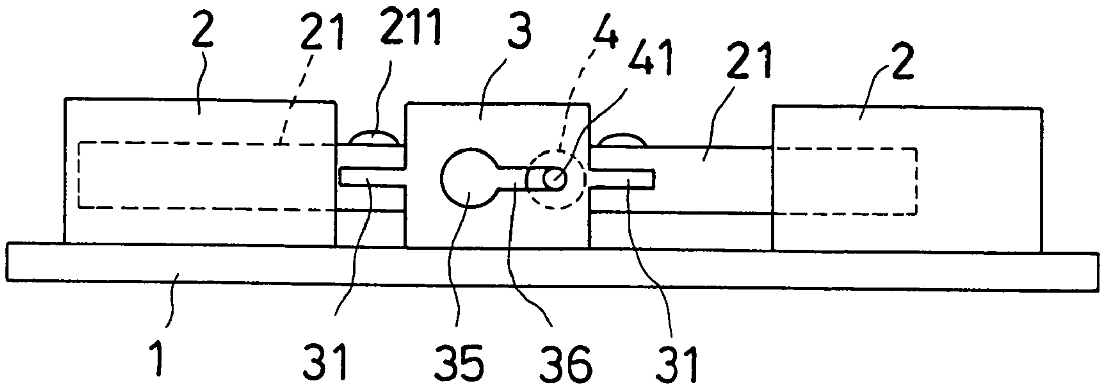
FIG. 2 is a front view of the first embodiment of the present invention in the locking position.

Referring to FIGS. 2, 3, and 4, the stopping block 3 is displaced to, and kept at a stopping position, wherein the slot 36 thereof is around the steel rope 41, by means of controlling the actuating member; thus, the lock block 4 will be stopped by the stopping block 3 when a pulling force is exerted on the steel rope 41 to seek to open the hood, preventing the hood from being opened; the stopping block 3 will be stopped, and held in position by the beads 115 as soon as the upper and the lower detaining holes 32 are mounted onto the corresponding beads 115 while the stopping block 3 is being displaced by means of the actuating member.

Figure 5:
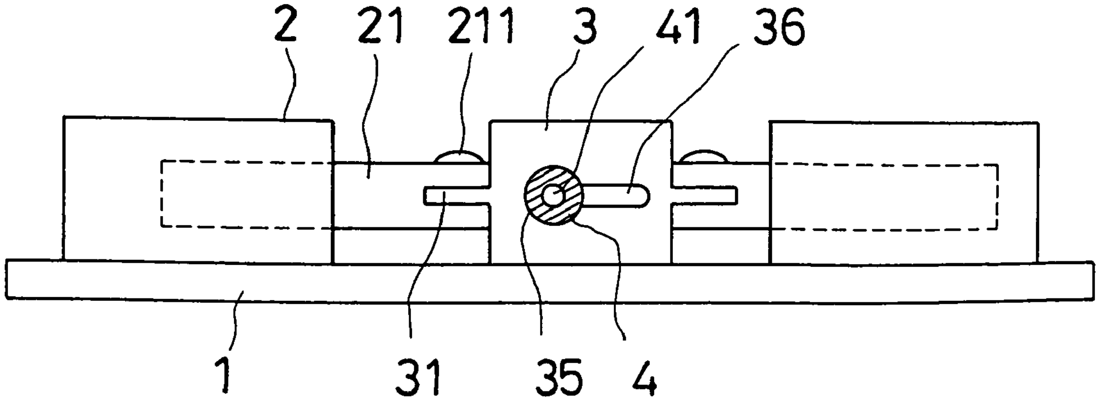
FIG. 5 is a front view of the first embodiment in the unlocking position.
Figure 6:
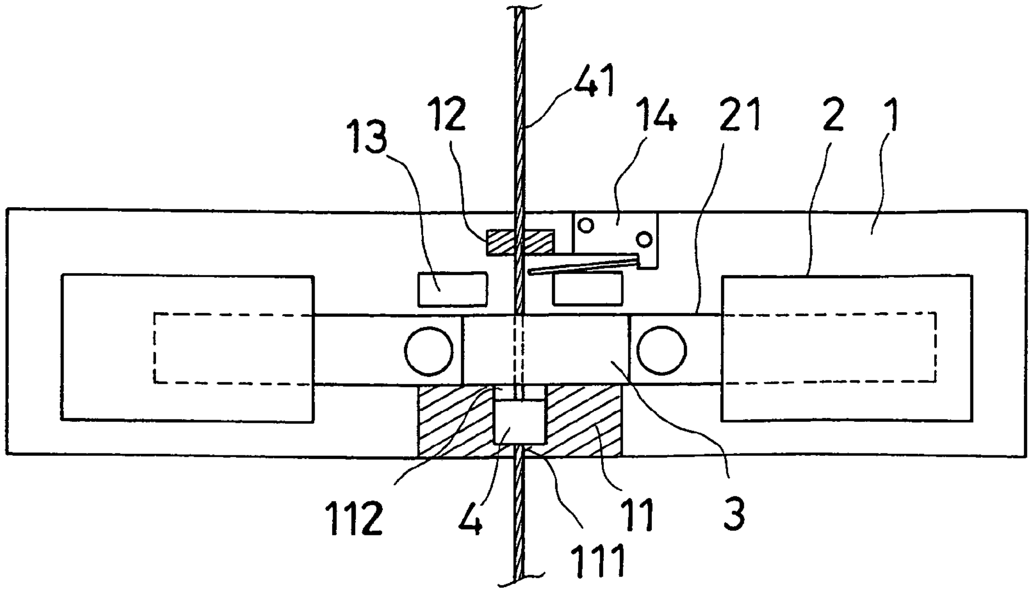
FIG. 6 is a horizontal section of the first embodiment in the unlocking position.
Figure 7:
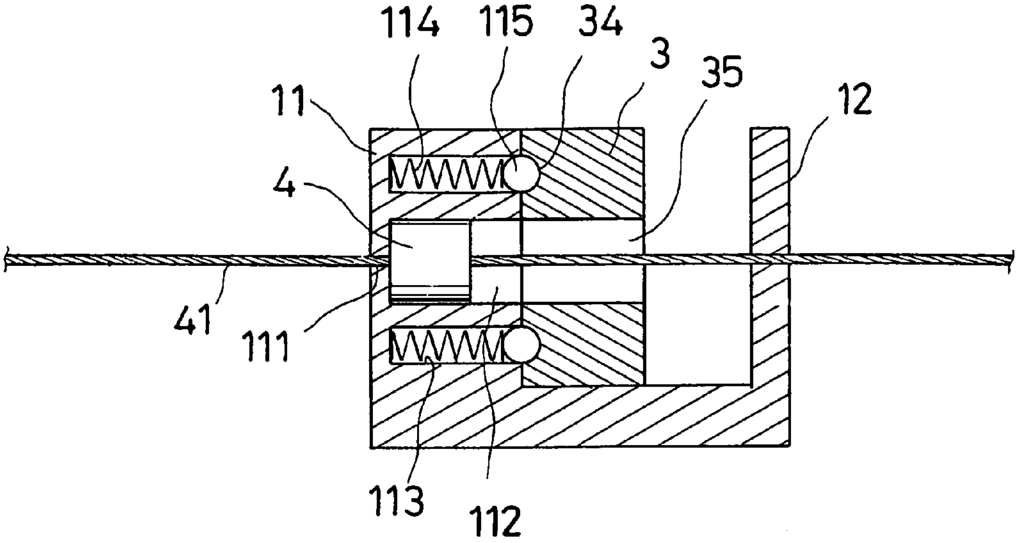
FIG. 7 is a vertical section of the first embodiment in the unlocking position.

Referring to FIGS. 5, 6, and 7, the stopping block 3 is displaced to, and kept at an idle position, wherein the through hole 35 thereof is around the steel rope 41, by means of controlling the actuating member. Thus, when a pulling force is exerted on the steel rope 41, the lock block 4 will be passed through the through hole 35 and into the holding cavity 112 of the locating block 11 of the base 1, and in turns, the hood is opened; the stopping block 3 will be stopped, and held in position by the beads 115 as soon as the upper and the lower detaining holes 34 are mounted onto the corresponding beads 115 while the stopping block 3 is being displaced by means of the actuating member.

Figure 8:
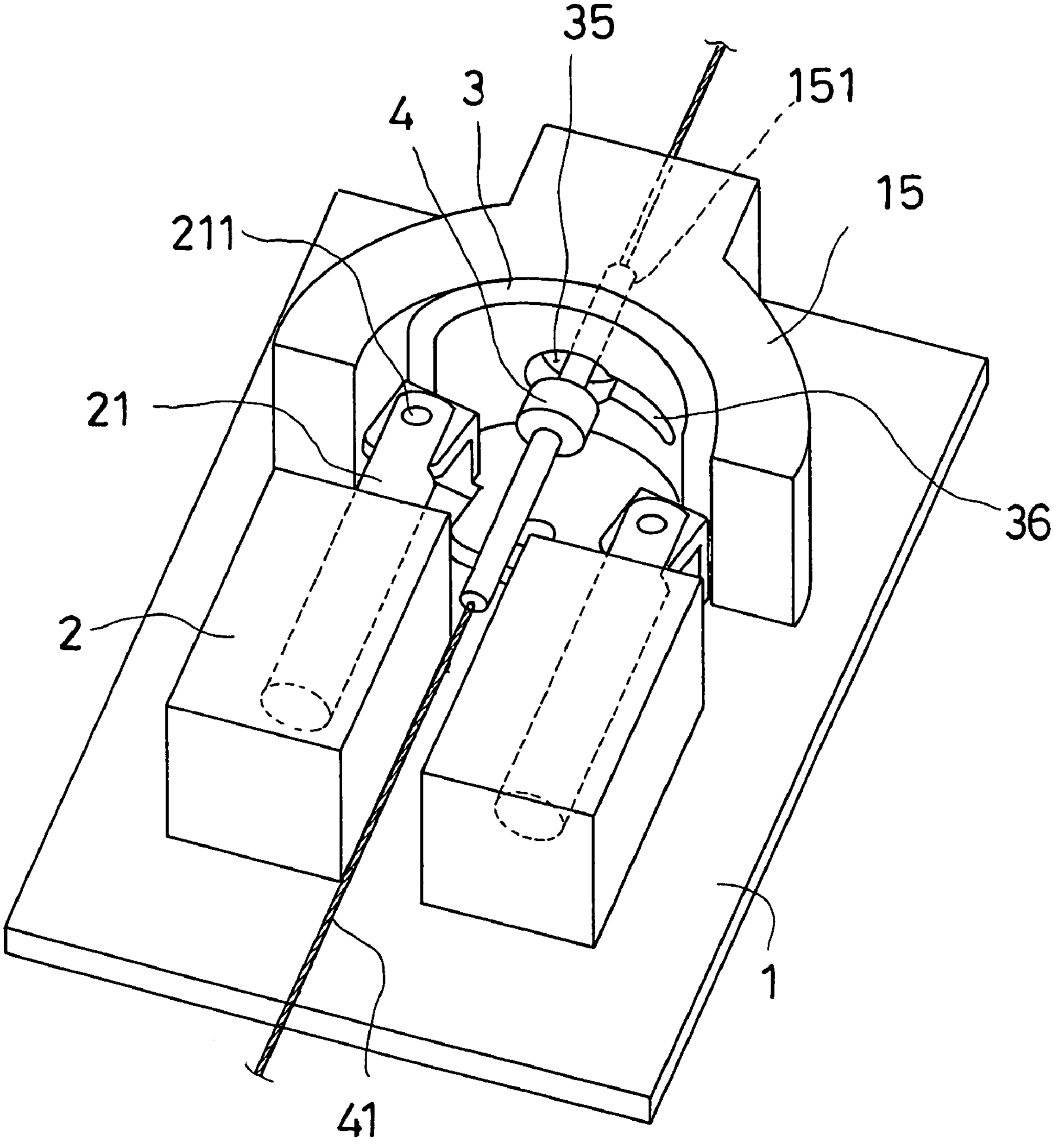
FIG. 8 is a perspective view of a second embodiment.

Referring to FIG. 8, a second embodiment of a device used for protecting a car against thievery is provided, which basically has the same structure as the first embodiment, but which has a curved stopping block 3' instead of a rectangular one. The curved stopping block 3' has a through hole 35, and a horizontally extending slot 36' communicating with the through hole 35', and it is angularly displaceable on a base 1 while two actuating rods 21 of an actuating member point to, and contact two ends of the curved stopping block 3' for angularly displacing the curved stopping block 3' with. And, a curved guide block 15, which has a through hole 151, is secured on the base 1 with a curved side thereof being next to a curved side of the curved stopping block 3', and steel rope 41 of the hood control of the car is passed through the through hole 151 and the curved stopping block 3'. Therefore, the second embodiment has the same function as the first embodiment.

In addition, hydraulic actuators, and air pressure actuators can be used, connected to the stopping blocks 3, 3', instead of the above actuating members equipped with the electromagnets 2.

From the above description, it can be easily understood that the device of the present invention has the following advantages:

1. Thieves can't open the hood when the stopping block of the present protecting device is in such position as to block the way of the lock block. Therefore, thieves can't open the hood or cut off power to the alarm after they break into the car, and the main alarm can keep on sounding for scaring off the thieves and making other people notice once it is activated by break-in of the thieves.

2. The car is further protected against thievery with the auxiliary alarm, which will be activated to alarm if the hook control is used to seek to make the hood become openable after the auxiliary alarm has been set to the ready mode.

What is claimed is:

1. A device used for protecting a car against thievery, comprising a base secured to a car; the base being formed with a locating block on a bottom portion thereof, and a locating bar secured on the bottom portion and opposing the locating block; the locating bar having a through hole; the locating block having a holding cavity facing the through hole of the locating bar; the locating block having a through hole communicating with the holding cavity;

a lock block secured around a steel rope of a control of a hood of the car, which control can be used to pull the steel rope for making the hood become openable; the steel rope being passed through the through holes of the locating block and the locating bar with the lock block being arranged between the locating block and the locating bar; the lock block being formed with such a size as to be capable of moving into the holding cavity of the locating block;

a stopping block arranged between the locating block and the locating bar and displaceable on the base; the stopping block having a through hole, and an horizontally extending slot communicating with the through hole and substantially as high as a center of the through hole; the stopping block being around the steel rope at the through hole and the slot thereof; the through hole being formed with such a size as to allow the lock block to pass through it; the slot being at least slightly narrower than the lock block; the stopping block being displaceable to a stopping position, in which position the slot thereof exactly faces the lock block; the stopping block being displaceable to an idle position, in which position the through hole thereof exactly faces the lock block; and an actuating member for causing displacement of the stopping block with; the actuating member including two electromagnets each having an actuating rod movably fitted thereto; the actuating rods being arranged in such a way as to point to respective ones of two ends of the stopping block; the actuating rods being connected with the corresponding ends of the stopping block so as to be capable of displacing the stopping block when they are actuated by means of controlling the actuating member;

the steel rope being prevented from moving to such a position where the hood can be opened when the lock block is stopped from passing through the stopping block.

2. The device used for protecting a car against thievery as claimed in claim 1, wherein the locating block has upper and lower holding rooms facing the stopping block and respectively above and under the holding cavity, each of which holding rooms contains an elastic element therein while the stopping block has two upper detaining holes above the through hole thereof and as high as the upper holding room of the locating block, and two lower detaining holes under the through hole thereof and as high as the lower holding room; the two upper detaining holes having an intermediate guide slot communicating with them; the two lower detaining holes having an intermediate guide slot communicating with them; beads being sandwiched between outer ends of the elastic elements and the stopping block for the detaining holes to be mounted over during displacement of the stopping block.

3. The device used for protecting a car against thievery as claimed in claim 1, wherein two opposing post portions are formed between the locating block and the locating bar on the bottom portion of the base, and the steel rope is passed through a space between the opposing post portions.

4. The device used for protecting a car against thievery as claimed in claim 1, wherein the stopping block is curved such that the actuating rods of the actuating member will cause angular displacement of the stopping block between the stopping position and the idle position when they are actuated, and a curved guide block is secured in position with a curved side thereof being next to a curved side of the curved stopping block; the curved guide block having a through hole, through which the steel rope is passed.

5. The device used for protecting a car against thievery as claimed in claim 4, wherein the actuating member is equipped with hydraulic mechanisms instead of the electromagnets.

6. The device used for protecting a car against thievery as claimed in claim 4, wherein the actuating member is equipped with air pressure mechanisms instead of the electromagnets.

7. The device used for protecting a car against thievery as claimed in claim 1, wherein a switch is electrically connected to an auxiliary alarm, and the lock block will be closely pressed against the switch for preventing the alarm from being activated when the hood of the car is closed without external pulling force being exerted on the steel rope to seek to make the hood become openable; after the auxiliary alarm has been set to a ready mode, it being going to be activated as soon as the lock block stops closely touching the switch; as soon as the hood control is used to seek to make the hood become openable, the steel rope being going to be at least slightly linearly displaced such that the lock block is no longer closely pressed against the switch.

8. The device used for protecting a car against thievery as claimed in claim 1, wherein the actuating member is equipped with hydraulic mechanisms instead of the electromagnets.

9. The device used for protecting a car against thievery as claimed in claim 1, wherein the actuating member is equipped with air pressure mechanisms instead of the electromagnets.

* * * * *